US012031724B2

(12) United States Patent
Kubiak

(10) Patent No.: US 12,031,724 B2
(45) Date of Patent: Jul. 9, 2024

(54) TURBINE ENGINE COMBUSTOR HAVING A COMBUSTION CHAMBER HEAT SHIELD

(71) Applicant: GENERAL ELECTRIC COMPANY, Schenectady, NY (US)

(72) Inventor: Krzysztof Kubiak, Warsaw (PL)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 17/867,726

(22) Filed: Jul. 19, 2022

(65) Prior Publication Data

US 2023/0358404 A1 Nov. 9, 2023

(30) Foreign Application Priority Data

May 5, 2022 (PL) ........................................ 441103

(51) Int. Cl.
*F23R 3/28* (2006.01)
*F23R 3/16* (2006.01)

(52) U.S. Cl.
CPC ...... *F23R 3/283* (2013.01); *F05D 2260/2212* (2013.01); *F05D 2260/22141* (2013.01); *F23R 3/16* (2013.01); *F23R 3/286* (2013.01); *F23R 2900/03043* (2013.01); *F23R 2900/03045* (2013.01)

(58) Field of Classification Search
CPC .. F23R 3/283; F23R 3/16; F23R 3/286; F23R 2900/03043; F23R 2900/03045; F05D 2260/2212; F05D 2260/22141
See application file for complete search history.

(56) References Cited

U.S. PATENT DOCUMENTS

| | | | | |
|---|---|---|---|---|
| 5,323,604 A * | 6/1994 | Ekstedt | F23R 3/34 60/804 |
| 5,669,759 A | 9/1997 | Beabout | |
| 6,481,966 B2 | 11/2002 | Beeck et al. | |
| 10,253,986 B2 | 4/2019 | Lacy et al. | |
| 11,112,114 B2 | 9/2021 | Pritchard et al. | |
| 2008/0110024 A1 | 5/2008 | Reilly et al. | |
| 2013/0089434 A1* | 4/2013 | Simpson | F01D 5/187 165/96 |
| 2013/0243575 A1* | 9/2013 | Zelesky | F01D 25/12 415/116 |
| 2014/0086724 A1* | 3/2014 | Tibbott | F01D 5/187 29/889.7 |
| 2014/0112799 A1* | 4/2014 | Lee | F01D 5/187 416/97 R |
| 2017/0248021 A1* | 8/2017 | Auxier | F01D 9/041 |
| 2019/0072276 A1 | 3/2019 | Porter et al. | |
| 2020/0325782 A1* | 10/2020 | Maltson | F01D 5/187 |

FOREIGN PATENT DOCUMENTS

| | | |
|---|---|---|
| EP | 3453970 A3 | 3/2019 |
| EP | 3438537 B1 | 11/2020 |

* cited by examiner

*Primary Examiner* — Gerald L Sung
*Assistant Examiner* — Rene D Ford
(74) *Attorney, Agent, or Firm* — McGarry Bair PC

(57) ABSTRACT

A turbine engine that includes a compressor section, combustion section, and turbine section. The combustion section includes a combustor liner defining a combustion chamber. At least one fuel nozzle and at least one heat shield are located in the combustion chamber. The at least one heat shield includes an internal air flow passage and a pin bank.

19 Claims, 8 Drawing Sheets

TURBINE ENGINE COMBUSTOR HAVING A COMBUSTION CHAMBER HEAT SHIELD

CROSS-REFERENCE TO RELATED APPLICATION(S)

This application claims priority to Polish Application No. P.441103, filed May 5, 2022, which is incorporated herein by reference in its entirety.

TECHNICAL FIELD

The disclosure generally relates to a turbine engine with a combustor, and more specifically to a combustor with a heat shield for a combustion chamber of the combustor.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

A combustor of a gas turbine engine is configured to burn fuel in a combustion chamber. Such a configuration can place a substantial heat load on the structure of the combustor. Priorities in such an environment can include improved cooling or improved control of air flow.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
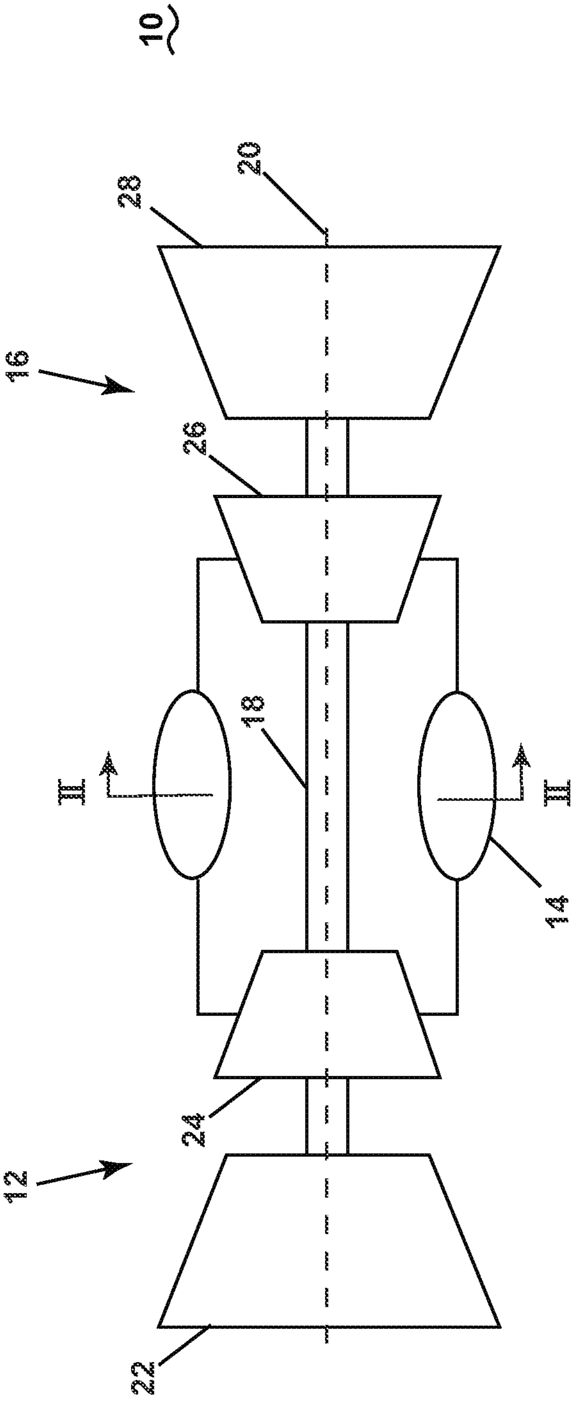
FIG. 1 is a schematic view of a turbine engine having a compression section, a combustion section, and a turbine section in accordance with various aspects described herein.

Aspects of the disclosure described herein are generally directed to a turbine engine having a combustor defining a combustion chamber. A plurality of fuel cups or fuel-air mixers, such as a fuel nozzle integrated with a swirler, emit a fuel-air mixture into the volume limited by a combustor liner defined as a combustion chamber. That is, the combustion chamber receiving the fuel-air mixture can be defined, at least in part, by the combustor liner. A heat shield can be located, for example, between adjacent fuel-air mixers or between a fuel-air mixer and the combustor liner to provide a separation, barrier, or shield between components. The heat shield can absorb, direct, or otherwise provide a temperature difference between a first surface and a second surface. The heat shield has an internal air flow passage fluidly coupled to cooling air. The cooling air can be provided by, for example, the compressor section. A pin bank is located in the internal air flow passage to increase the heat transfer coefficient of the heat shield. The pin bank can include a plurality of subsets of pins. The pin bank or the plurality of subsets of pins can be organized in columns or rows, depending on viewpoint. At least a subset or column of the pins have an oblong cross-sectional shape. The shape of the pins and location of the columns are such that there is no linear path for air to flow through the internal air flow passage. Since there is no linear path for the air to flow, the air must take a longer length path to traverse the pin bank, contacting more surface area of the pin bank, thereby absorbing more heat. The increased path length or non-linear path through the pin bank improves the cooling effectiveness of the heat shield. An increase in cooling efficiency can reduce the volume of air needed to cool the heat shields, allow the same volume of air to provide improved cooling, or a combination therein.

Optionally, the air exiting the internal air flow passage into the combustion chamber can have an exit flow path that interacts with or supplements the swirl. Additionally, or alternatively, the exit flow path can transfer supplementary tangential momentum to the swirl of a fuel-air mixture. Yet another alternative is that the air exiting the internal air flow passage can create an air curtain around at least a portion of the fuel-air mixture, between adjacent fuel nozzles, or between a fuel nozzle and the combustor liner.

For purposes of illustration, the present disclosure will be described with respect to the combustion section or combustor for an aircraft turbine engine. It will be understood, however, that aspects of the disclosure described herein are not so limited and may have general applicability within an engine, including compressors, power generation turbines, as well as in non-aircraft applications, such as other mobile applications and non-mobile industrial, commercial, automotive, and residential applications.

Reference will now be made in detail to the combustor architecture, and in particular the heat shields located within a combustion chamber of a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms “first”, “second”, and “third” may be used interchangeably to distinguish one component from another and are not intended to signify location or importance of the individual components.

The terms “forward” and “aft” refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term “upstream” refers to a direction that is opposite the fluid flow direction, and the term "downstream" refers to a direction that is in the same direction as the fluid flow. As may be used herein, "fore" or "forward" means in front of something and "aft" or "rearward" means behind something. For example, when used in terms of fluid flow, fore/forward can mean upstream and aft/rearward can mean downstream.

The term "fluid" may be a gas or a liquid. As may be used herein, "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or "a set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. The compressor section 12, the combustion section 14, or the turbine section 16 can be in an axial flow arrangement. The compressor section 12, the combustion section 14, or the turbine section 16 can define an axially extending engine centerline. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26 and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel, ignited, and burned, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
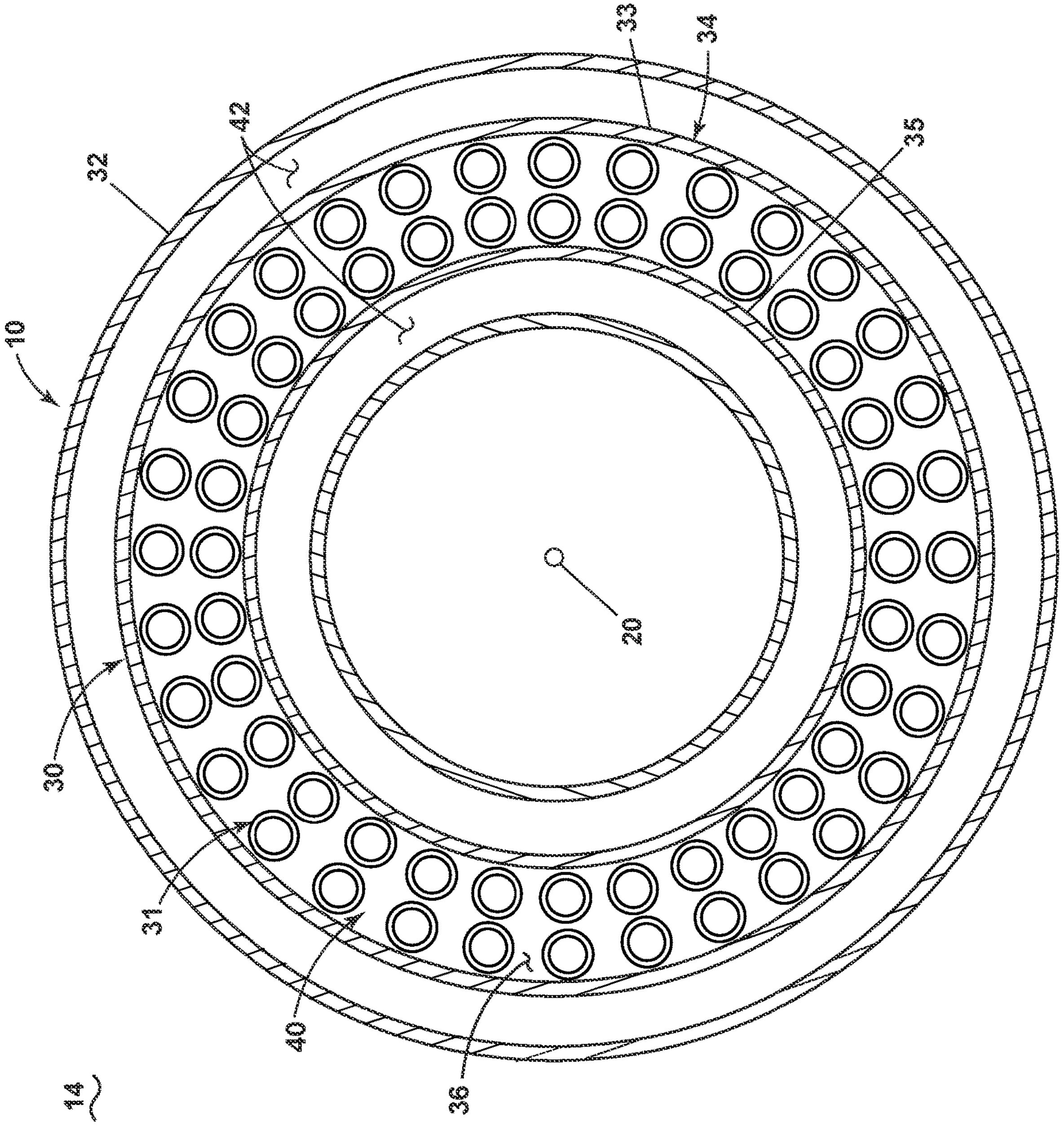
FIG. 2 is a cross-sectional view of the combustion section of FIG. 1 along line II-II in accordance with various aspects described herein.

FIG. 2 depicts a cross-sectional view of the combustion section 14 along line II-II of FIG. 1. The combustion section 14 can include a combustor 30 with an annular arrangement of fuel cups, pre-mixers, fuel-air mixers, or fuel nozzles 31 disposed around the centerline or rotational axis 20 of the turbine engine 10. It should be appreciated that the annular arrangement of the fuel cups or fuel nozzles 31 can be one or multiple fuel nozzles, and one or more of the fuel nozzles 31 can have different characteristics. The combustor 30 can have a can, can-annular, or annular arrangement depending on the type of engine in which the combustor 30 is located. In a non-limiting example, the combustor 30 can have a combination arrangement located with a casing 32 of the engine.

The combustor 30 can be at least partially defined by a combustor liner 34. The combustor liner 34 can be a combustor casing, a flame tube, or include multiple layers of casing or liners. That is, the combustor liner 34 can define at least a portion of a combustion chamber or volume for a can, can-annular, or annular arrangement combustor.

In some examples, the combustor liner 34 can include an outer liner 33 and an inner liner 35 concentric with respect to each other and arranged in an annular fashion about the engine centerline or rotational axis 20. In some examples, the combustor liner 34 can have an annular structure about the combustor 30. In some examples, the combustor liner 34 can include multiple segments or portions collectively forming the combustor liner 34. A dome assembly 36 together with the combustor liner 34 can at least partially define a combustion chamber 40 arranged annularly about the rotational axis 20. A compressed air passage 42 can be defined at least in part by both the combustor liner 34 and the casing 32.

Figure 3:
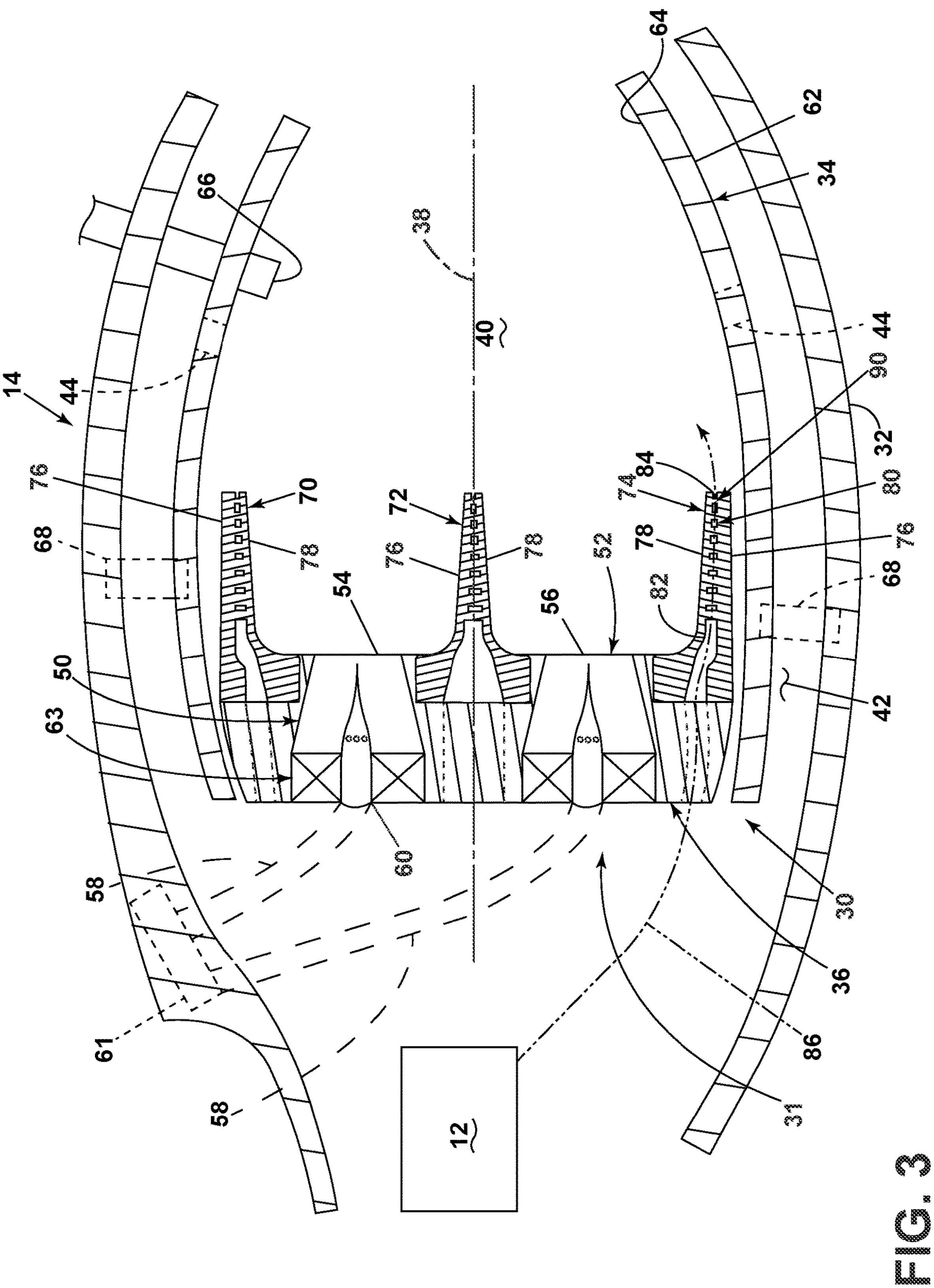
FIG. 3 is a cross-sectional view of a combustor that can be utilized in the combustion section of FIG. 2 in accordance with various aspects described herein.

FIG. 3. depicts a cross-section view of a portion of a combustion section suitable for use in the combustion section 14 located between the compressor section 12 and the turbine section 16 (FIG. 1) of the turbine engine 10. A combustor axis 38 can extend in an axial direction and be defined by the combustor 30.

The compressed air passage 42 defined at least in part by the combustor liner 34 and the casing 32 can receive compressed air from the compressor section 12. Optionally, in the combustor liner 34 can include a cooling circuit, such as, but not limited to multi-holes, nugget holes, or, as illustrated by dotted line, dilutions holes 44. The cooling circuit or dilution holes 44 can fluidly couple the compressed air passage 42 to the combustion chamber 40.

At least one fuel nozzle or the fuel nozzles 31 are illustrated, by way of example, as a first fuel nozzle 50 and a second fuel nozzle 52. A first fuel outlet 54 and a second fuel outlet 56 fluidly couple the first fuel nozzle 50 and the second fuel nozzle 52, respectively, to the combustion chamber 40. It should be appreciated that the annular arrangement of fuel nozzle 31 can be one or multiple fuel nozzles where the one or more of the fuel nozzles can have different characteristics as the first fuel nozzle 50 and the second fuel nozzle 52 are shown for illustrative purposes only and are not intended to be limiting.

The first fuel nozzle 50 and the second fuel nozzle 52 can be coupled to or disposed within the dome assembly 36. At least one fuel supply line 58, as illustrated by dotted line, can couple fuel injectors 60 of the first fuel nozzle 50 and second fuel nozzle 52 to a fuel supply assembly or fuel tank 61, as illustrated by dotted line. A swirler 63 can be provided to swirl incoming air in proximity to the fuel injectors 60. The swirler 63 can be included in the at least one fuel nozzle 31 or coupled to the at least one fuel nozzle 31.

The combustor liner 34 can have an outer surface 62 and an inner surface 64 at least partially defining the combustion chamber 40. The combustor liner 34 can be made of one continuous monolithic portion or be multiple monolithic portions assembled together to define the combustor liner 34. By way of non-limiting example, the outer surface 62 can define a first piece, while the inner surface 64 can define a second piece that when assembled together form the combustor liner 34. As described herein, combustor liner 34 can include at least one cooling circuit illustrated, by way of example, as the dilutions holes 44. It is further contemplated that the combustor liner 34 can be any type of combustor liner 34, including but not limited to a double walled liner or a tile liner. An igniter 66 can be fluidly coupled to the combustion chamber 40, at any location, by way of non-limiting example downstream of the dilution holes 44.

Optionally, at least one fixing assembly 68 can couple the combustor liner 34 to the casing 32. The at least one fixing assembly 68, as illustrated by dotted line, can be at any location and can include additional structure or mechanically fasteners that secure at least a portion of the casing 32 and the combustor liner 34. Alternatively, portions of the combustor liner 34 can be integrally formed with the casing 32.

At least one heat shield can extend from the dome assembly 36 into the combustion chamber 40. The at least one heat shield is illustrated, by way of example, as a first heat shield 70, a second heat shield 72, and a third heat shield 74. Each of the first heat shield 70, the second heat shield 72, and the third heat shield 74 include a first surface 76 and a second surface 78.

As illustrated, by way of non-limiting example, the first heat shield 70 is adjacent and separate from the combustor liner 34. While illustrated as having a space between the combustor liner 34 and the first heat shield 70, it is contemplated that a portion of the first heat shield 70 can be in contact with a portion of the combustor liner 34. The first heat shield 70 is also illustrated as adjacent the first fuel nozzle 50. That is, the first heat shield 70 can be radially between the first fuel outlet 54 of the first fuel nozzle 50 and the combustor liner 34.

The second heat shield 72 is illustrated, by way of non-limiting example, as radially located between the first fuel outlet 54 of the first fuel nozzle 50 and the second fuel outlet 56 of the second fuel nozzle 52. That is, the first heat shield 70 and the second heat shield 72 can be located on radially opposite sides of the first fuel outlet 54 of the first fuel nozzle 50. The second heat shield 72 can provide a barrier between or otherwise separate the first fuel outlet 54 and the second fuel outlet 56.

The third heat shield 74, as illustrated, by way of non-limiting example, is adjacent the combustor liner 34. The third heat shield 74 is also illustrated as adjacent the second fuel nozzle 52. That is, the third heat shield 74 can be radially between the second fuel outlet 56 of the second fuel nozzle 52 and the combustor liner 34. The second heat shield 72 and the third heat shield 74 can be located on radially opposite sides of the second fuel outlet 56 of the second fuel nozzle 52. While illustrated as having a space between the combustor liner 34 and the third heat shield 74, it is contemplated that a portion of the third heat shield 74 can be in contact with a portion of the combustor liner 34.

While illustrated as having two fuel nozzles and three heat shields, any number of fuel nozzles and heat shields are contemplated. It is further contemplated that the outlet of each fuel nozzle has a heat shield located at or adjacent to the radially outer side of the outlet and another heat shield located at or adjacent to the radially inner side of the outlet.

An internal air flow passage 80 can be defined, at least in part, by the first surface 76 and the second surface 78 of each of the first heat shield 70, the second heat shield 72, and the third heat shield 74. The internal air flow passage 80 includes an air inlet 82 and an air outlet 84. A portion of the compressed air from the compressor section 12 can flow to the combustion chamber 40 through the internal air flow passage 80, illustrated by flow path arrow 86. That is, a portion of the compressed air from the compressor section 12 can flow into the air inlet 82, through the internal air flow passage 80, and exit the air outlet 84 into the combustion chamber 40.

A plurality of pins, referred to herein as a pin bank 90, are located within the internal air flow passage 80. The pins of the pin bank 90 can extend from the first surface 76 or the second surface 78. It is contemplated that at least a subset of pins of the pin bank 90 extend between or are unitarily formed with the first surface 76 and the second surface 78. That is, the at least a subset of the pin bank 90 couples the first surface 76 to the second surface 78. While illustrated as generally linear, the first surface 76 or the second surface 78 can be curved or include a curved or angled portion.

It is further contemplated that a subset of pins of the pin bank 90 can extend from the first surface 76 towards the second surface 78, without coupled or connecting to the second surface 78. Additionally, or alternatively a subset of pins of the pin bank 90 can extend from the second surface 78 towards the first surface 76, without coupling or connecting to the first surface 76.

It is yet further contemplated the pin bank 90 can be curved horizontally (along the columns, described presently) or vertically along the flow path. That is, the pin bank 90 can include at least a subset of pins angled or curved as they extend from the first surface 76 or the second surface 78.

Figure 4:
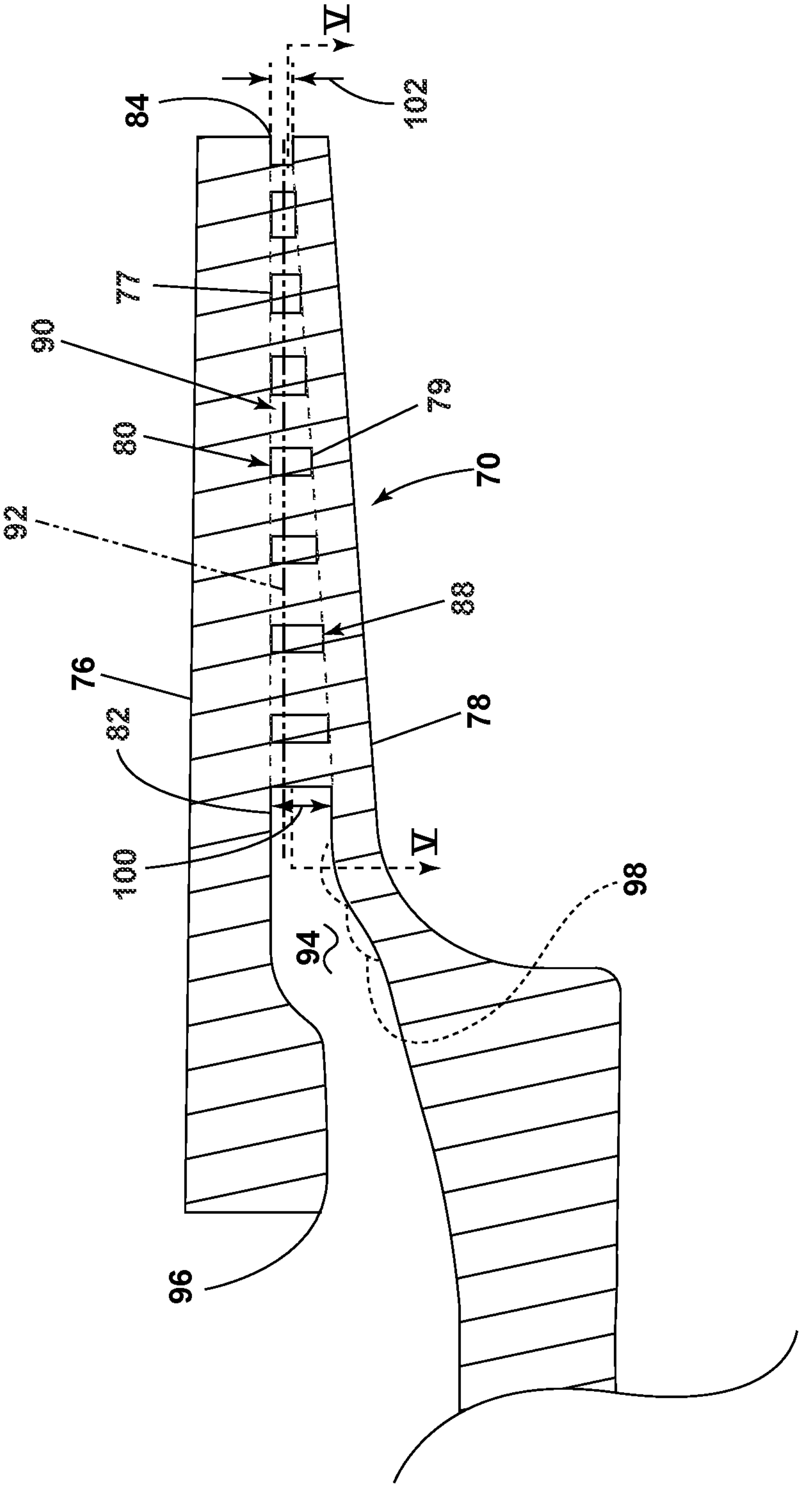
FIG. 4 is an enlarged cross-sectional view of at least a portion of the heat shield of FIG. 2 in accordance with an exemplary embodiment of the present disclosure.

FIG. 4 is an enlarged cross-sectional view of at least a portion of the first heat shield 70. An air flow passage centerline 92 extends in a downstream direction from the air inlet 82 to the air outlet 84 of the internal air flow passage 80. A plurality of openings 88 can appear between pins. That is, the pin bank 90 extending from the first surface 76 to the second surface 78 can define the plurality of openings 88. The plurality of openings 88 illustrate portions of the internal air flow passage 80, further illustrated by dotted line, wherein an airflow in the internal air flow passage 80 can wrap around or flow into or out of the page around the pin bank 90 as the airflow passes from the air inlet 82 to the air outlet 84.

The first heat shield 70 can include a cavity 94 upstream and fluidly coupled to the air inlet 82. That is, curved, contoured, or linear portions of the first surface 76 and the second surface 78 upstream of the internal air flow passage 80 can define the cavity 94. A heat shield inlet 96 can receive compressed gas from the compressor section 12 (FIG. 3). Alternatively, the heat shield inlet 96 can receive bleed air from upstream of the HP compressor 24 (FIG. 1).

Optionally, flow diverters 98, as illustrated by dotted line, can be located in the cavity 94 or adjacent the air inlet 82 of the internal air flow passage 80. While illustrated as protrusions, the flow diverters 98 can be recesses or other known structures used to divert, turn, or swirl the flow of air from the cavity 94 before entering the internal air flow passage 80.

A first passage height 100 can be measured at the air inlet 82 of the internal air flow passage 80. A second passage height 102 can be measured at a passage outlet or the air outlet 84. A ratio of the first passage height 100 to the second passage height 102 can be equal to or between 1:1 and 3:1. That is, the effective area of the internal air flow passage 80 from the air inlet 82 to the air outlet 84 can be uniform or converging. It is contemplated that the ratio of the first passage height 100 to the second passage height 102 is between 1.5:1 and 2:1. The uniform or converging effective area of the internal air flow passage 80 can maintain the effective area and/or velocity of the air flowing through the internal air flow passage 80, even after the air flow contacts and flows around the pins on its way through the pin bank 90.

As illustrated, by way of example, a second air flow passage wall 79 adjacent the second surface 78 converges along a downstream direction towards the air flow passage centerline 92. However, it is contemplated that alternatively, a first air flow passage wall 77 adjacent the first surface 76 can converge towards the air flow passage centerline 92. It is further contemplated and illustrated, by way of example, by the second heat shield 72 in FIG. 3, that a first air flow passage wall adjacent the first surface 76 and a second air flow passage wall adjacent the second surface 78 can converge along a downstream direction towards the air flow passage centerline 92.

Figure 5:
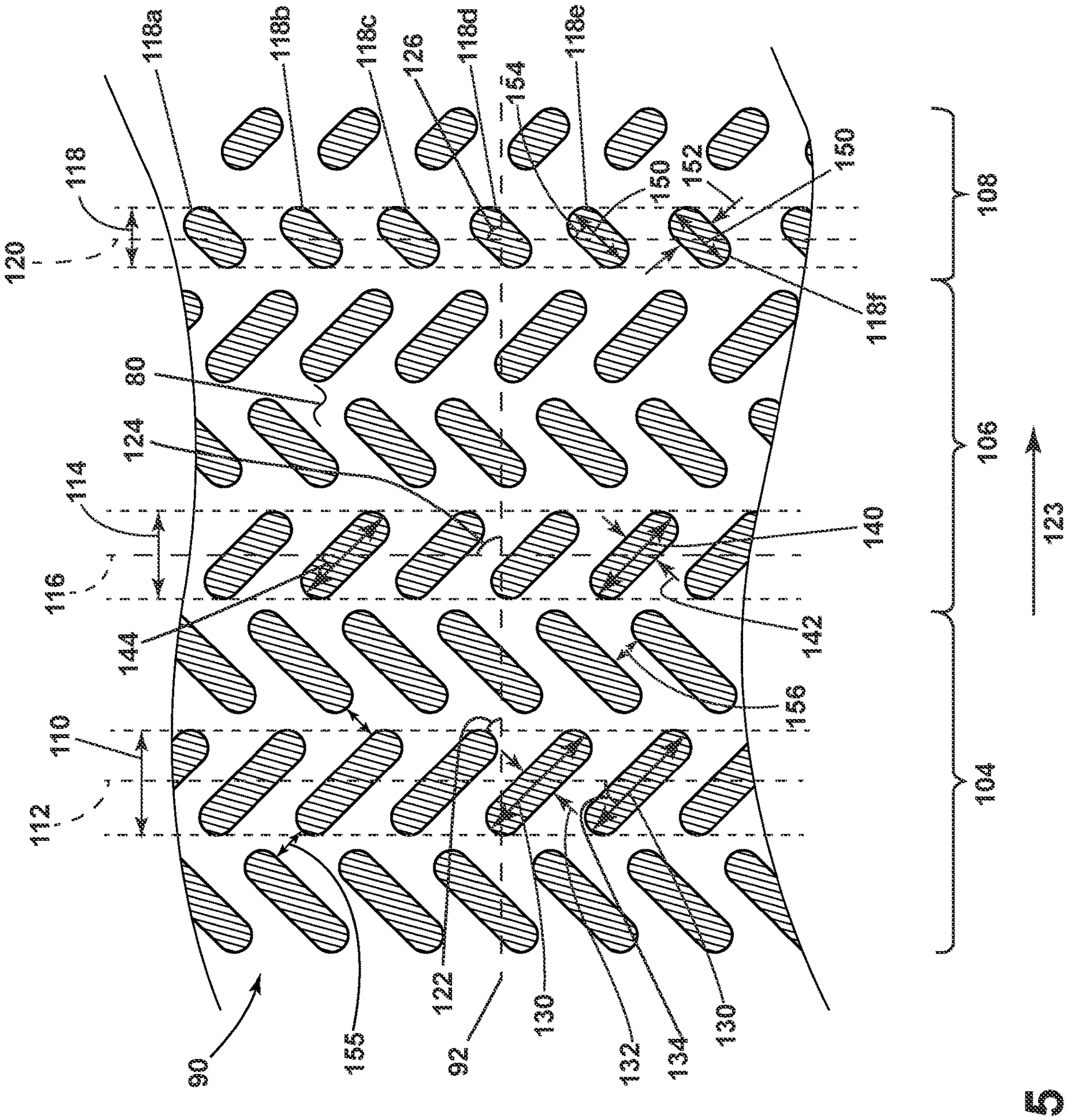
FIG. 5 is a cross-sectional view taken at the line V-V of FIG. 4 further illustrating a pin bank of the heat shield accordance with an exemplary embodiment of the present disclosure.

FIG. 5 is a schematic cross section further illustrating the pin bank 90. The pin bank 90 is illustrated, by way of example, as having eight columns of pins located within the internal air flow passage 80. However, any number of pins or columns of pins are contemplated.

The pin bank 90 can include one or more subsets of pins, such as a first subset 104, a second subset 106, or a third subset 108. While illustrated as having the same shape or size, it is contemplated that a subset can include any number of continuous or discontinuous groups of pins having different sizes or shapes.

While illustrated as having an oblong cross-sectional shape, or more specifically, a stadium-shaped or racetrack-shaped cross section, it is contemplated that one or more pins of the pin bank 90 can have a different shaped cross section. By way of non-limiting example one or more of the pins or subsets of the pin bank 90 can have a cross section that is an ellipse, an oval, a rounded rectangle, teardrop, or a V-shape. It is contemplated that the cross-sectional shape of the one or more subsets of pins can include at least one symmetric axis.

The subsets of pins 104, 106, 108 can include a plurality of pins, where the plurality of pins can be arranged in any number of columns or other configurations such as, but not limited to geometric. Exemplary columns are illustrated, by way of example, as a first column of pins 110, a second column of pins 114, and a third column of pins 118.

For example, the first column of pins 110 can define a first column centerline 112. The second column of pins 114 can define a second column centerline 116. The second column centerline 116 can be spaced from the first column centerline 112. By way of non-limiting example, the second column centerline 116 is axially spaced downstream of the first column centerline 112, where the general direction of downstream is illustrated by flow direction arrow 123. The first column of pins 110 and second column of pins 114 are spaced relative to each other such that, in combination with the non-circular cross section of at least a subset of pins from the pin bank 90, there no linear path through the pin bank 90 in the downstream direction. While illustrated herein as linear, it is contemplated that the columns can be non-linear.

The third column of pins 118 can define a third column centerline 120. The third column centerline 120 can be spaced from the first column centerline 112 and the second column centerline 116. By way of non-limiting example, the third column centerline 120 is axially spaced and downstream of the first column centerline 112 and the second column centerline 116.

Columns of pins 110, 114, 118 can be groups of adjacent pins. Adjacent pins in the same column are illustrated, for example, as a first pin 118*a*, a second pin 118*b*, a third pin 118*c*, a fourth pin 118*d*, a fifth pin 118*e*, and a sixth pin 118*f*. Optionally, the adjacent pins in the column can have the same cross-sectional shape or the same orientation.

The first column centerline 112 can form a first column angle 122 relative to the air flow passage centerline 92. That is, the first column angle 122 can be measured counterclockwise from the air flow passage centerline 92 to the first column centerline 112.

A second column angle 124 can be measured counterclockwise from the air flow passage centerline 92 to the second column centerline 116. A third column angle 126 can be measured counterclockwise from the air flow passage centerline 92 to the third column centerline 120.

While illustrated as equal, it is contemplated that the first column centerline 112, the second column centerline 116, or the third column centerline 120 can form any angle with respect to the air flow passage centerline 92. It is further contemplated that the angle, as measured clockwise from the air flow passage centerline 92 to any column centerline can be greater than zero and less than 180.

Each pin, for example pins 118*a*, 118*b*, 118*c*, 118*d*, 118*e*, 118*f*, of the pin bank 90 has a length or a major body axis that is the greatest cross-sectional dimension. A width or a minor body axis can be measured in the cross-sectional plane generally perpendicular to the length or major body axis, where the term "generally perpendicular" is defined as an angle equal to or between 85 degrees and 95 degrees. Alternatively, the width or the minor body axis can be measured in the cross-sectional plane at any angle with respect to the length or the major body axis.

At least one pin of the first column of pins 110 includes a first length 130 and a first width 132. A first pin angle 134 can be measured between the first length 130 and the first column centerline 112.

A second major body axis, or a second length 140 and a second minor body axis or a second width 142 can be measured in the cross-sectional plane of at least one of the pins in the second column of pins 114. A second pin angle 144 can be measured between the second length 140 and the second column centerline 116. The second pin angle 144 can be generally equal to the first pin angle 134, however, it is contemplated that the second pin angle 144 can be between 0 degrees and 180 degrees. It is further contemplated that the difference between the first pin angle and the second pin angle 144 is 90 degrees.

At least one pin of the third column of pins 118 includes a third length 150 and a third width 152. A third pin angle 154 can be measured between the third length 150 and the third column centerline 120. The third pin angle 154 can be generally equal to the first pin angle 134 or the second pin angle 144, however, it is contemplated that the third pin angle 154 can be between 0 degrees and 180 degrees. It is further contemplated that the difference between the first pin angle 134 or the second pin angle 144 and the third pin angle 154 is 90 degrees.

The ratio of the first length 130 to the first width 132, the second length 140 to the second width 142, or the third length 150 to the third width 152 can be between 1.1:1 and 4:1. However, it is contemplated that the ratio of the first, second, or third length 130, 140, 150, to the first, second, or third width 132, 142, 152, respectively, is between 1.5:1 and 3:1.

It is further contemplated that the ratio of first length 130 to the first width 132 is equal to or between 1.1:1 and 2:1, the ratio of second length 140 to the second width 142 is greater than 2:1, and the ratio of the third length 150 to the third width 152 is equal to or between 1:1 and 2:1.

By way of example, the first length 130 can be less than the second length 140. Alternatively, the first length 130 can be equal to or greater than the second length 140. The second length 140 can be greater than the third length 150. Alternatively, the second length 140 can be equal to or less than the third length 150. The first length 130 can be equal to the third length 150. Alternatively, the first length 130 can be greater than or less than the third length 150.

Ratios remain the same or decrease. Increase then decrease

The first width 132, the second width 142, or the third width 152 can be generally equal, where the term "generally equal" indicates that the values are within 5% of each other. Alternatively, the value or measurement of the first width 132, the second width 142, or the third width 152 can differ. That is, the value or measurement of the first width 132, the second width 142, or the third width 152 can be not equal.

The first length 130 and the first width 132 can be indicative of the first column of pins 110 or the first subset 104. That is, the length and width of the plurality of pins that make up the column or subset can be considered when determining the first length 130 or the first width 132. The average, median, mode, or other algebraic combination of the length of each pin in the plurality of pins the defines the first column of pins 110 or first subset 104 can be used to determine the first length 130. Similarly, the average, median, mode, or other algebraic combination of the width of each pin in the plurality of pins the defines the first column of pins 110 or first subset 104 can be used to determine the first width 132.

It is also contemplated that the second length 140, the second width 142, the third length 150, or the third width 152 can be indicative of the second column of pins 114, the second subset 106, the third of pins column 118, or the third subset 108.

A gap or a column distance 155 can be a distance measured between two pins, where each pin is in an adjacent column of pins. That is, the column distance 155 can be measured as the shortest distance between two adjacent pins from adjacent columns of pins. The column distance 155 can vary between one or more pairs of adjacent columns of pins. It is contemplated that the column distance 155 can be within 0% to 20% of the first width 132, the second width 142, or the third width 152.

Optionally, the column distance 155 can be equal within subsets 104, 106, 108 of the pin bank 90. It is contemplated that the column distance 155 can vary between subsets 104, 106, 108 of the pin bank 90. Further, it is contemplated that the column distance 155 can be equal through the pin bank 90.

A pin distance 156 can be measured between adjacent pins in the same column. That is, the pin distance 156 can be measured as the shortest distance between two adjacent pins in the same columns of pins. The pin distance 156 can vary between one or more pairs of adjacent pins. It is contemplated that the pin distance 156 can be within 0% to 20% of the first width 132, the second width 142, or the third width 152.

Optionally, the pin distance 156 can be equal within subsets 104, 106, 108 of the pin bank 90. It is also contemplated that the pin distance 156 can vary between subsets 104, 106, 108 of the pin bank 90. Further, it is contemplated that the pin distance 156 can be equal through the pin bank 90.

While illustrated as non-overlapping, it is contemplated that one or more adjacent pins can overlap. That is, a line drawn parallel to the centerline of a column can pass through or intersect two adjacent pins from different columns. In other words, the pin bank 90 can includes a subset pins that overlap in a radial or axial direction.

It is further contemplated that one or more adjacent pins can overlap while the centerlines of the one or more adjacent pins remain discrete or non-overlapping. That is, while the centerlines of the one or more adjacent pins do not overlap, a line drawn parallel to the centerline of a column can pass through or intersect two adjacent pins from different columns.

Figure 6:
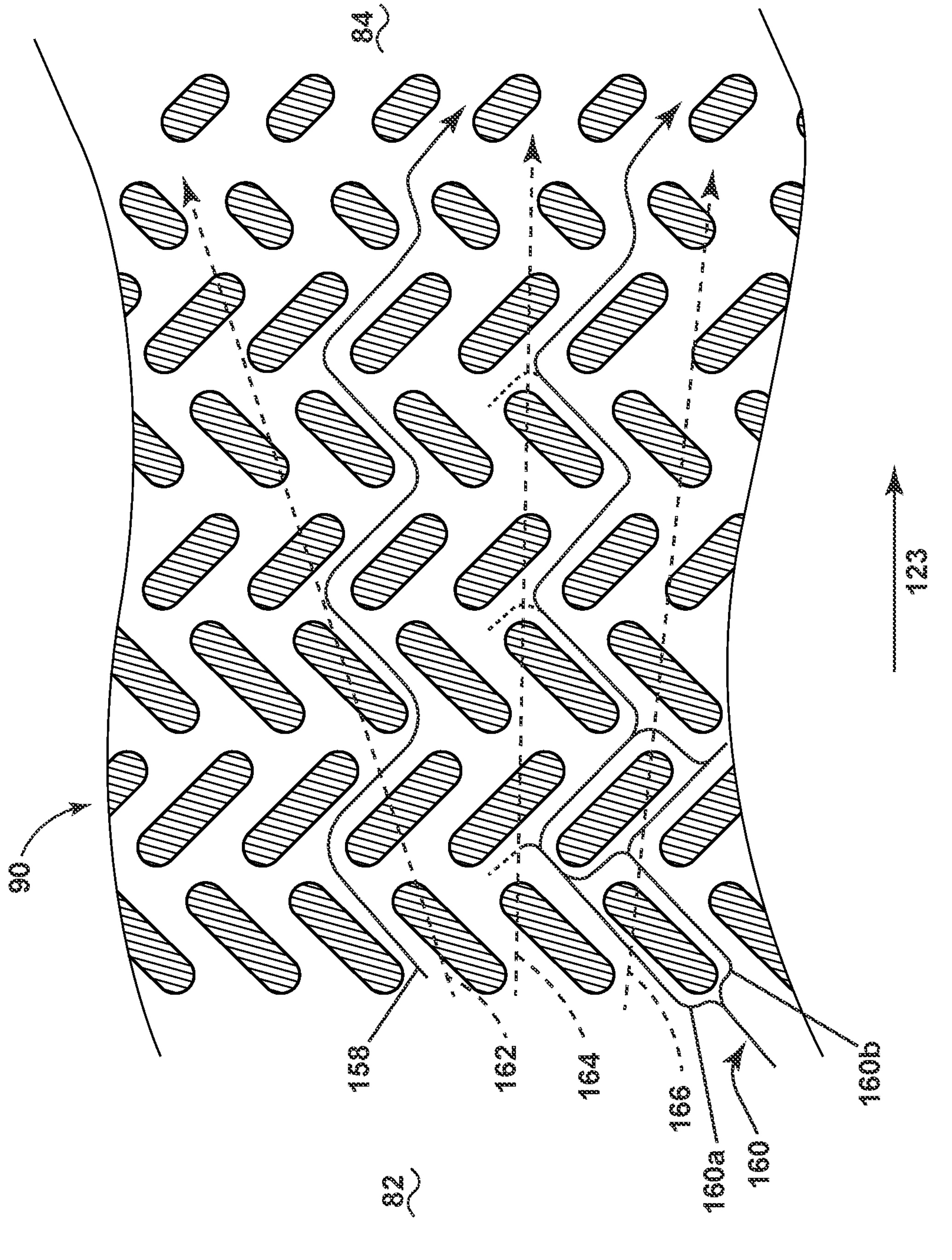
FIG. 6 is the pin bank of FIG. 5 further illustrating air flow in accordance with an exemplary embodiment of the present disclosure.

FIG. 6 is a schematic cross section further illustrating airflow through the pin bank 90. By way of example, a first non-linear air flow path 158 illustrates an example of an at least partially serpentine, curved, or non-linear air flow path that can flow through the pin bank 90. The first non-linear air flow path 158 fluidly connects the air inlet 82 to the air outlet 84.

A second non-linear air flow path 160 is another example of an at least partially serpentine, curved, or non-linear air flow path that splits into a first split flow 160*a* and a second split flow 160*b*. The first split flow 160*a* and a second split flow 160*b* can rejoin, as illustrated. Alternatively, it is also contemplated that the first split flow 160*a* or the second split flow 160*b* can receive or join other airflows (not shown) or exit the pin bank 90 between different sets of adjacent pins.

A linear flow path is any flow path that directly connects, by shortest distance, the air inlet 82 and the air outlet 84. Air cannot flow through the pin bank 90 in a linear path. The oblong or non-circular cross-sectional shape of at least a subset or column of pins and the axial spacing of the subsets or column of pins prevents an air flow path from being linear. A first linear flow path 162 is illustrated in dotted line as it is impossible for air to actually follow or flow along the first linear flow path 162. A second linear flow path 164 and a third linear flow path 166 are also illustrated as a dotted line to further illustrate what is considered a linear flow path. In other words, there is no straight line along which fluid can flow from the air inlet 82 to the air outlet 84. Any such attempt at a linear flow path is blocked or otherwise impeded by at least a subset of pins from the pin bank 90. All possible air flow paths through the pin bank 90 include at least a curve or bend when flowing from the air inlet 82 to the air outlet 84. That is, any air flow path that fluidly couples the air inlet 82 and the air outlet 84 includes at least a serpentine or curvilinear portion.

During operation, compressed air from the compressor section 12 or bleed air from upstream of the HP compressor 24 (FIG. 1) is provided to the first, second, and third heat shields 70, 72, 74 (FIG. 3). The internal air flow passage 80, defined by the first, second, and third heat shields 70, 72, 74 fluidly couples the compressed air from the compressor section 12 or bleed air from upstream of the HP compressor 24 to the combustion chamber 40 (FIG. 3).

As the air flows into the air inlet 82 and through the internal air flow passage 80, the air thermally conducts heat from the portions of the first and second surfaces 76, 78 that define the internal air flow passage 80 as well as the pin bank 90 (FIG. 3 and FIG. 4). The pin bank 90 includes at least a subset of pins with a cross-section having an oblong or non-circular cross-sectional shape. The shape of the subset of pins and the axial spacing of the columns of pins is such so that there is no linear path through the pin bank (FIG. 5-FIG. 8). Referring again to FIG. 6, the first non-linear air flow path 158, by way of example, illustrates an at least partially serpentine, curvilinear, curved or bent air flow path that can flow through the pin bank 90 from the air inlet 82 to the air outlet 84. Since there is no linear path, the length of time and therefore the heat conducted by the air increases. Additionally, the pin bank 90 includes pins with non-circular cross sections. The pin bank 90 having at least a subset of pins with non-circular cross sections can be compared to a pin bank that includes only pins with circular cross sections. Consider the situation in which the circular cross sectional and non-circular cross section have the same minor body axis or width. The surface area in contact with the air flowing through the pin bank having pins with non-circular cross sections is greater when than the surface area in contact with the air flowing through the pin bank with only circular cross section pins. The increase in surface area of the pins having the non-circular cross sections can increase the overall heat transfer coefficient of the heat shield, when compared to the heat transfer coefficient of the heat shield that includes only pins with a circular cross section.

The second non-linear air flow path 160 flow is likely to separate on one pin and reattach on another to ensure "touching" of flow medium. The second non-linear air flow path 160 illustrates improved heat pick-up and therefore an increase the overall heat transfer coefficient of the heat shield, when compared to the heat transfer coefficient of the heat shield that includes only pins with a circular cross section.

When exhausted, the air from the first, second, or third heat shields 70, 72, 74 can have an exit flow path that interacts with or supplements the swirl of the fuel-air mixture in the combustion chamber 40 (FIG. 3). Additionally, or alternatively, the exit flow path can transfer supplementary tangential momentum to the swirl of a fuel-air mixture. Yet another alternative is that the air exiting the internal air flow passage 80 can create an air curtain around at least a portion of the fuel-air mixture, between adjacent fuel nozzles 50, 52, or between the fuel nozzles 50, 52 and the combustor liner 34. (FIG. 3)

Figure 7:
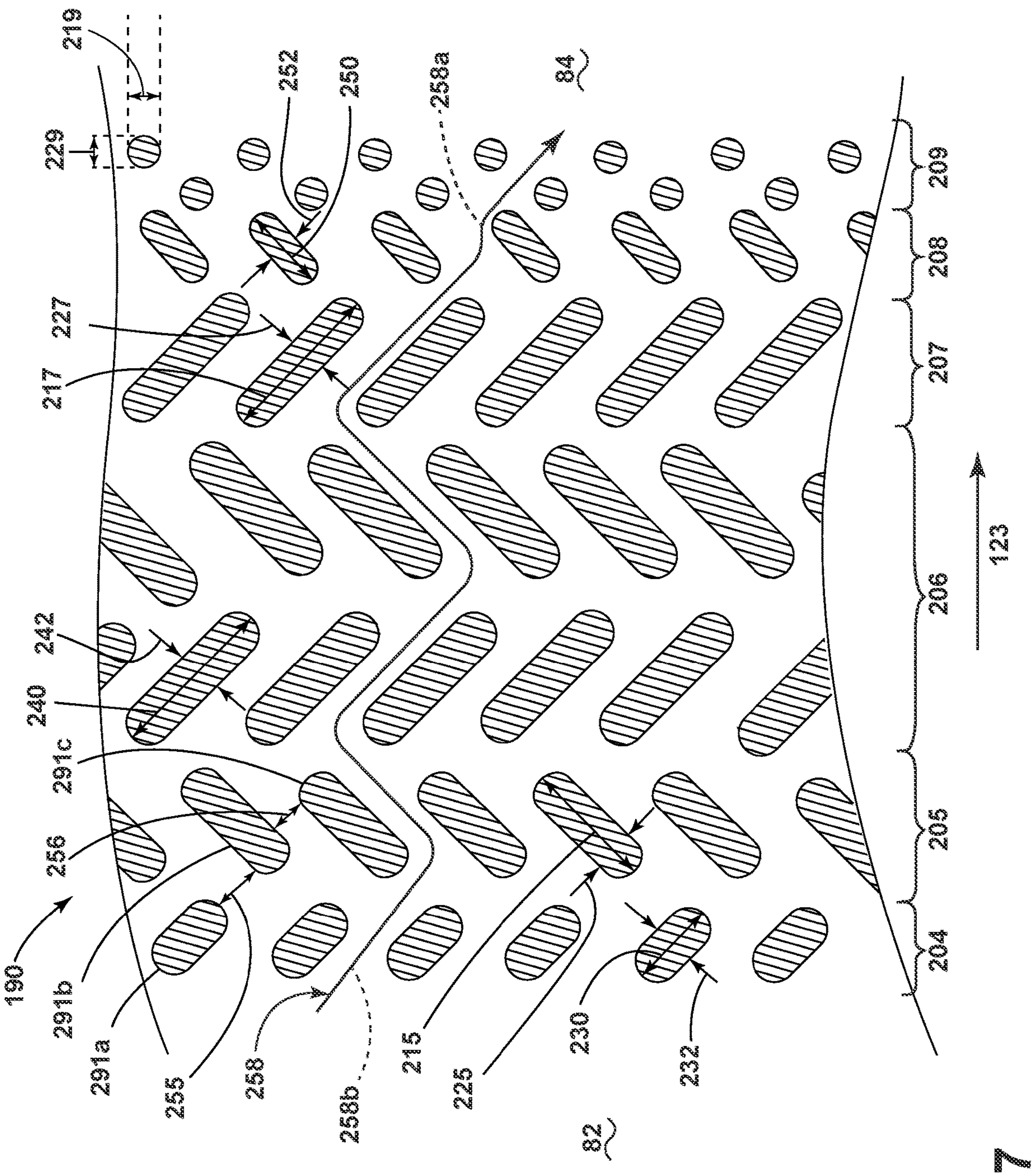
FIG. 7 is a cross-sectional view of a pin bank of a heat shield in accordance with another exemplary embodiment of the present disclosure.

FIG. 7 illustrates a cross section of another exemplary pin bank 190. The pin bank 190 is similar to pin bank 90 of FIG. 5, therefore, like parts will be identified with like numerals increased by 100, with it being understood that the description of the like parts of pin bank 90 applies to the pin bank 190, unless otherwise noted.

The pin bank 190 can include one or more subsets of pins, such as a first subset 204, a second subset 206, and a third subset 208. A fourth subset 205 can be located downstream of the first subset 204 and upstream of the second subset 206. A fifth subset 207 can be located between the second subset 206 and the third subset 208. A sixth subset 209 can be located downstream of the third subset 208. The first, second, third, fourth, fifth, or sixth subset 204, 205, 206, 207, 208, 209 can be made up of a plurality of pins. The plurality of pins can be arranged in any number of columns or other configurations.

By way of non-limiting example, pins in each of the first, second, third, fourth, fifth, and sixth subsets 204, 205, 206, 207, 208, 209 can be grouped based on size and shape. For example, the pins in the first subset 204 have the same size and shape, but can have different angles or orientation with respect to the flow direction arrow 123.

Pins in the first, second, and third subsets 204, 206, 208 can have a first, second, and third length 230, 240, 250 and a first, second, and third length width 232, 242, 252, respectively. The fourth, fifth, and sixth subsets 205, 207,

209 can include pins with a fourth, fifth, and sixth length 215, 217, 219 and a fourth, fifth, and sixth width 225, 227, 229, respectively.

The ratio of the length 215, 217, 219, 230, 240, 250 to the width 225, 227, 229, 232, 242, 252 can be equal to or between 1:1 and 4:1. However, it is contemplated that the ratio between the first, second, third, fourth, and fifth lengths 215, 217, 230, 240, 250 and the first, second, third, fourth, and fifth widths 225, 227, 232, 242, 252 is between 1.1:1 and 3:1. Optionally, the ratio of the sixth length 219 to the sixth width 229 can be 1:1. That is, the pins in the sixth subset 209 can have, but are not limited to, a circular cross-sectional shape.

The value or measurement of the widths 225, 227, 229, 232, 242, 252 of the pins for each of the respective subsets 204, 205, 206, 207, 208, 209 can differ. As illustrated, by way of non-limiting example, the widths 225, 227, 229, 232, 242, 252 of each of the subsets 204, 205, 206, 207, 208, 209 can decrease in the direction of the air flow, as indicated by the flow direction arrow 123. Alternatively, the widths 225, 227, 229, 232, 242, 252 can be generally equal, where the term "generally equal" indicates that the values are within 5% of each other. It is also contemplated that the widths 225, 227, 232, 242, 252 can be generally equal and greater or less than the sixth width 229.

A column distance 255 can be a distance measured between two adjacent pins, for example, between a first pin 291*a* and a second pin 291*b*. That is, the column distance 255 can be measured as the shortest distance between two adjacent pins from adjacent columns of pins. The column distance 255 can be equal through the pin bank 190. Alternatively, the column distance 255 can vary between one or more pairs of adjacent columns of pins. It is contemplated that the column distance 255 can be within 0% to 20% of the first width 232, the second width 242, the third width 252, the fourth width 225, the fifth width 227, or the sixth width 229.

A pin distance 256 can be measured between adjacent pins in the same column, for example, between the second pin 291*b* and a third pin 291*c*. That is, the pin distance 256 can be measured as the shortest distance between two adjacent pins from adjacent columns of pins.

By way of example, an air flow path 258 is illustrated as having an at least partially serpentine, curved, or non-linear portion 258*a*. Optionally, in addition to the non-linear portion 258*a*, the air flow path 258 can include a linear portion 258*b*. The air flow path 258 fluidly connects the air inlet 82 to the air outlet 84. It is also contemplated that different pin dimensions or cross-sectional shapes can be incorporated that provide linear portions and non-linear portions of various flow paths or split flow paths through the pin bank 190.

Figure 8:
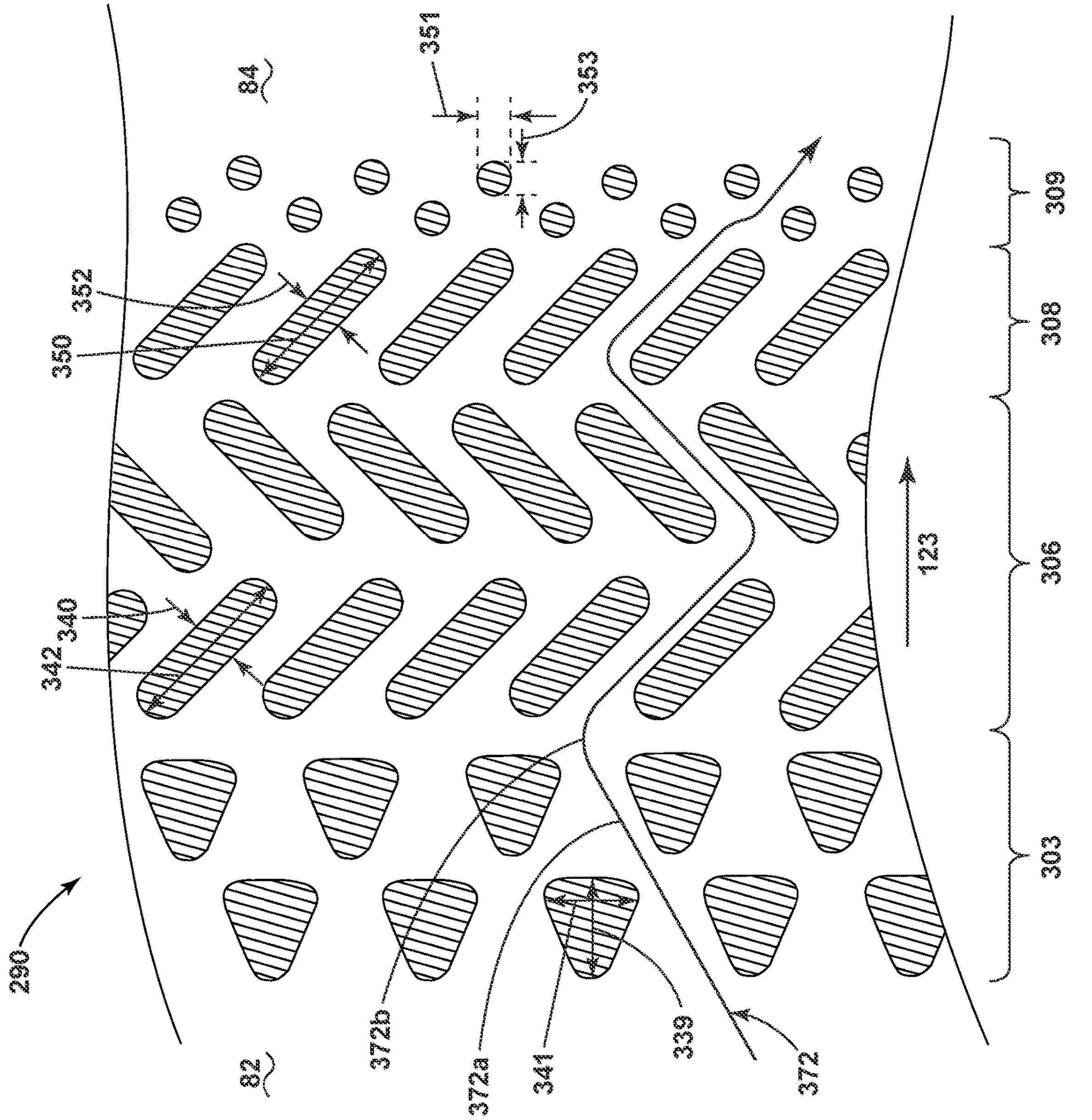
FIG. 8 is a cross-sectional view of a pin bank of a heat shield in accordance with yet another exemplary embodiment of the present disclosure.

FIG. 8 illustrates a cross section of another exemplary pin bank 290. The pin bank 290 is similar to pin bank 190 of FIG. 7, therefore, like parts will be identified with like numerals further increased by 100, with it being understood that the description of the like parts of pin bank 190 applies to the pin bank 290, unless otherwise noted.

The pin bank 290 can include one or more subsets of pins, such as a first subset 303, a second subset 306, a third subset 308, and a fourth subset 309.

By way of non-limiting example, pins in each of the first, second, third, and fourth, subsets 303, 306, 308, 309 can be grouped based on size, shape, or orientation with respect to the flow direction arrow 123.

Pins in the first, second, third, and fourth subsets 303, 306, 308, 309 can have a first, second, third and fourth length 339, 340, 350, 351 and a first, second, third and fourth width 341, 342, 352, 353, respectively.

The ratio of the length 339, 340, 350, 351 to the width 341, 342, 352, 353 can be equal to or between 1:1 and 4:1.

The value or measurement of the lengths 339, 340, 350, 351 or widths 341, 342, 352, 353 of the pins for each of the respective subsets 303, 306, 308, 309 can differ between subsets or between pins within each of the subsets 303, 306, 308, 309. Alternatively, the lengths 339, 340, 350, 351 or the widths 341, 342, 352, 353 can be generally equal between two or more pins or two or more subsets 303, 306, 308, 309.

It is further contemplated that the lengths 339, 340, 350, 351 can be generally equal to or within 5% of one or more of the widths 341, 342, 352, 353.

By way of example, the ratio of the first length 339 to the first width 341 can be 1:1 while the overall cross-sectional shape of at least one pin in the pin bank 290 is oblong or non-circular. In other words, the cross-sectional shape of at least a subset of pins of the pin bank 290 can have a teardrop or a V-shape.

A non-linear air flow path 372 is illustrated, by way of example, as flowing from the air inlet 82 to the air outlet 84. The non-linear air flow path 372 can include linear portions 372*a*, however, at least a portion 372*b* of the non-linear air flow path 372 is curved, curvilinear, serpentine, or otherwise changing direction. It is also contemplated that different pin dimensions or cross-sectional shapes can be incorporated that provide linear portions and non-linear portions of various flow paths or split flow paths through the pin bank 290.

A benefit associated with the disclosure as described herein includes an increase in the length of time it takes a volume of air to pass through the heat shields in a combustion chamber. The pin banks in the internal air flow passages of the heat shields include at least a subset of pins with an oblong or non-circular cross section. The cross-sectional shapes of the subset of pins and location of the pins disrupt what was once a linear path through the internal air flow passages. An increase of time in the internal air flow passages allows the air to thermally conduct more heat than a shorter time in the internal air flow passages. This can improve thermal performance or reduce the volume of air required to obtain the same thermal effect.

Another benefit is that the air exiting the internal air flow passage of the heat exchanger into the combustion chamber can have an exit flow path that interacts with or supplements the swirl of the fuel-air mixture in the combustion chamber. Additionally, or alternatively, the exit flow path can transfer supplementary tangential momentum to the swirl of a fuel-air mixture. The interaction or transfer supplementary tangential momentum between the air exiting the heat shield and the swirl of a fuel-air mixture can provide acoustical benefits.

Another benefit is that the air exiting the internal air flow passage can create an air curtain around at least a portion of the fuel-air mixture, between adjacent fuel nozzles or between the fuel nozzle and the combustor liner. More particularly, the air exiting the internal air flow passage can create an air curtain around at least a portion of the fuel-air mixture. The air flow exiting the internal air flow passage can also provide an air curtain between adjacent fuel nozzles or between the fuel nozzle and the combustor liner.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A turbine engine comprising a compressor section, combustion section, and turbine section in serial flow arrangement, with the combustion section comprising a combustor liner defining a combustion chamber, at least one fuel nozzle having a fuel outlet fluidly coupled to the combustion chamber, at least one heat shield located adjacent to the fuel outlet of the fuel nozzle and extending into the combustion chamber, the at least one heat shield comprising, an internal air flow passage with an air inlet and an air outlet, with the air outlet fluidly coupled to the combustion chamber, and an air flow passage centerline extending in a downstream direction from the air inlet to the air outlet, and a pin bank located within the internal air flow passage and having a first column of pins defining a first column centerline forming a first angle relative to the air flow passage centerline, a second column of pins defining a second column centerline forming a second angle relative to the air flow passage centerline, the second column centerline spaced downstream of the first column centerline, the first column of pins and the second column of pins having different cross-sectional shapes, wherein the first column of pins or the second column of pins include an oblong cross-sectional shape.

The turbine engine of the preceding clause, wherein the first column of pins and the second column of pins define a portion of one or more air flow paths flowing through the pin bank in the downstream direction and fluidly coupling the air inlet to the air outlet, and wherein the one or more air flow paths includes at least a serpentine or a curvilinear portion.

The turbine engine of any preceding clause, wherein a first passage height of the air inlet and a second passage height of the air outlet have a ratio of the first passage height to the second passage height equal to or between 1:1 and 3:1.

The turbine engine of any preceding clause, wherein the ratio of the first passage height to the second passage height is between 1.5:1 and 2:1.

The turbine engine of any preceding clause, wherein a cross-section of one or more pins in the first column of pins or the second columns of pins includes at least one symmetric axis.

The turbine engine of any preceding clause, wherein a cross-section of one or more pins in at least a subset of pins of the pin bank is a stadium-shape, an ellipse, an oval, a rounded rectangle, a teardrop, or a V-shape.

The turbine engine of any preceding clause, wherein the cross-section of the one or more pins in the at least a subset of pins of the pin bank is a stadium-shape, the stadium-shape having a length and a width, wherein a ratio of the length to the width is between 1.1:1 and 4:1.

The turbine engine of any preceding clause, wherein the ratio of the length to the width is between 1.5:1 and 3:1.

The turbine engine of any preceding clause, wherein the first column of pins or a first subset of pins of the pin bank includes a first length and a first width and the second column of pins or a second subset of pins of the pin bank includes a second length and a second width, wherein the first length and the second length are different.

The turbine engine of any preceding clause, wherein the pin bank further comprises a third column of pins or a third subset of pins of the pin bank having a third length and a third width.

The turbine engine of any preceding clause, wherein the first width and the second width are within 5% of the third width.

The turbine engine of any preceding clause, wherein a ratio of the first length to the first width is between 1.1:1 and 2:1, a ratio of the second length to the second width is greater than 2:1, and a ratio of the third length to the third width is between 1.1:1 and 2:1.

The turbine engine of any preceding clause, wherein a ratio of the first length to the first width is between 1.1:1 and 2:1, a ratio of the second length to the second width is greater than 2:1, and a ratio of the third length to the third width is equal to 1:1.

The turbine engine of any preceding clause, wherein the at least one heat shield is at least two heat shields extending from opposite sides of the at least one fuel nozzle.

The turbine engine of any preceding clause, wherein the at least one heat shield is at least a first heat shield, a second heat shield, and a third heat shield, and wherein the at least one fuel nozzle is a first fuel nozzle with a first outlet and a second fuel nozzle with a second outlet located radially adjacent to the first outlet.

The turbine engine of any preceding clause, wherein the first heat shield or the third heat shield is radially located between the combustor liner and the first outlet or the second outlet.

The turbine engine of any preceding clause, wherein the second heat shield is radially located between the first outlet and the second outlet.

A turbine engine comprising a compressor section, combustion section, and turbine section in serial flow arrangement, with the combustion section comprising a combustor liner defining a combustion chamber, at least one fuel nozzle having an outlet fluidly coupled to the combustion chamber, and at least one heat shield adjacent to the outlet of the fuel nozzle and extending into the combustion chamber, the at least one heat shield comprising an internal air flow passage with an air inlet and an air outlet, with the air outlet fluidly coupled to the combustion chamber, and a pin bank located within the internal air flow passage, a subset of pins of the pin bank having a non-circular cross section.

The turbine engine of any preceding clause, wherein the non-circular cross section of the subset of pins is a stadium-shape, the stadium-shape having a length and a width, wherein a ratio of the length to the width is between 1.1:1 and 4:1.

The turbine engine of any preceding clause, wherein the pin bank includes at least a first subset of pins having a first length and a first width and a second subset of pins, downstream of the first subset of pins, having a second length and a second width, wherein the first length is greater than the second length.

The turbine engine of any preceding clause, wherein the at least one heat shield includes a first surface and a second surface that at least partially define the air flow passage.

The turbine engine of any preceding clause, wherein the pins or a subset of pins of the pin bank extend from the first surface or the second surface without coupling or connecting the first surface to the second surface.

The turbine engine of any preceding clause, wherein the pins or a subset of pins of the pin bank couple the first surface and the second surface.

The turbine engine of any preceding clause, wherein a subset of pins from the pin bank define a plurality of opening between the subset of pins.

The turbine engine of any preceding clause, further comprising a cavity upstream of the internal air flow passage.

The turbine engine of any preceding clause, wherein the first length is less than the second length and greater than or equal to the third length.

The turbine engine of any of the preceding clauses, wherein the pin bank includes at least a first subset of pins having a first length and a first width and a second subset of pins, downstream of the first subset of pins, having a second length and a second width, wherein the first length is greater than the second length.

The turbine engine of any preceding clause, wherein the pin bank includes a subset pins that overlap in an axial direction.

What is claimed is:

1. A turbine engine comprising:

a compressor section, combustion section, and turbine section in serial flow arrangement, with the combustion section comprising:

a combustor liner defining a combustion chamber;

at least one fuel nozzle having a fuel outlet fluidly coupled to the combustion chamber;

at least one heat shield located adjacent to the fuel outlet of the fuel nozzle and extending into the combustion chamber, the at least one heat shield comprising:

an internal air flow passage with an air inlet and an air outlet, with the air outlet fluidly coupled to the combustion chamber, and an air flow passage centerline extending in a downstream direction from the air inlet to the air outlet; and a pin bank located within the internal air flow passage and having a first column of pins defining a first column centerline forming a first angle relative to the air flow passage centerline, a second column of pins defining a second column centerline forming a second angle relative to the air flow passage centerline, the second column centerline spaced downstream of the first column centerline, wherein the first column of pins or the second column of pins include an oblong cross-sectional shape;

wherein pins of the first column of pins or a first subset of pins of the pin bank include a first length and a first width, and pins of the second column of pins or a second subset of pins of the pin bank include a second length and a second width;

wherein the pin bank further comprises a third column of pins;

wherein pins of the third column of pins or a third subset of pins of the pin bank includes a third length and a third width;

wherein a first ratio of the first length to the first width is equal to or between 1.1:1 and 4:1, a second ratio of the second length to the second width is greater than the first ratio, and a third ratio of the third length to the third width is less than the first ratio; and wherein the first width and the second width are within 5% of the third width.

2. The turbine engine of claim 1, wherein the first column of pins and the second column of pins define a portion of one or more air flow paths flowing through the pin bank in the downstream direction and fluidly coupling the air inlet to the air outlet, and wherein the one or more air flow paths includes at least a serpentine or a curvilinear portion.

3. The turbine engine of claim 1, wherein a first passage height of the air inlet and a second passage height of the air outlet have a ratio of the first passage height to the second passage height equal to or between 1:1 and 3:1;

wherein the first passage height and the second passage height are defined between a first surface of the heat shield and a second surface of the heat shield in a radial direction of a centerline of the combustion section; and wherein the first, second, and third lengths and widths are defined along the first surface or the second surface.

4. The turbine engine of claim 3, wherein the ratio of the first passage height to the second passage height is between 1.5:1 and 2:1.

5. The turbine engine of claim 1, wherein the first length and the second length are different.

6. The turbine engine of claim 5, wherein the first ratio of the first length to the first width is between 1.1:1 and 2:1, the second ratio of the second length to the second width is greater than 2:1, and the third ratio of the third length to the third width is between 1.1:1 and 2:1.

7. The turbine engine of claim 5, wherein the first ratio of the first length to the first width is between 1.1:1 and 2:1, the second ratio of the second length to the second width is greater than 2:1, and the third ratio of the third length to the third width is equal to 1:1.

8. The turbine engine of claim 1, wherein the at least one heat shield is at least two heat shields extending from opposite sides of the at least one fuel nozzle.

9. The turbine engine of claim 1, wherein the at least one heat shield is at least a first heat shield, a second heat shield, and a third heat shield, and wherein the at least one fuel nozzle is a first fuel nozzle with a first outlet and a second fuel nozzle with a second outlet located radially adjacent to the first outlet.

10. The turbine engine of claim 9, wherein the first heat shield or the third heat shield is radially located between the combustor liner and the first outlet or the second outlet; and wherein the second heat shield is radially located between the first outlet and the second outlet.

11. The turbine engine of claim 1, wherein the first column centerline and the second column centerline are parallel to each other and perpendicular to the air flow passage centerline.

12. The turbine engine of claim 1, wherein the pin bank is arranged such that a linear flow path does not exist between the air inlet and the air outlet.

13. The turbine engine of claim 1, wherein the first column is upstream of the second column, and the second column upstream of the third column.

14. A turbine engine comprising:

a compressor section, combustion section, and turbine section in serial flow arrangement, with the combustion section comprising:

a combustor liner defining a combustion chamber;

at least one fuel nozzle having an outlet fluidly coupled to the combustion chamber; and at least one heat shield adjacent to the outlet of the fuel nozzle and extending into the combustion chamber, the at least one heat shield comprising:

an internal air flow passage with an air inlet and an air outlet, with the air outlet fluidly coupled to the combustion chamber; and a pin bank located within the internal air flow passage, the pin bank including a first subset of pins, a second subset of pins, and a third subset of pins;

wherein pins of the first subset of pins include a first length-width ratio equal to or between 1.1:1 and 4:1, pins of the second subset of pins include a second length-width ratio that is greater than the first length-width ratio, and pins of the third subset of pins include a third length-width ratio that is less than the first length-width ratio; and wherein widths of the first, second, and third subsets of pins are within 5% of each other.

15. The turbine engine of claim 14, wherein the third length-width ratio is 1:1.

16. A turbine engine comprising:

a compressor section, combustion section, and turbine section in serial flow arrangement, with the combustion section comprising:

a combustor liner defining a combustion chamber;

at least one fuel nozzle having a fuel outlet fluidly coupled to the combustion chamber;

at least one heat shield located adjacent to the fuel outlet of the fuel nozzle and extending into the combustion chamber, the at least one heat shield comprising:

an internal air flow passage with an air inlet and an air outlet, with the air outlet fluidly coupled to the combustion chamber, and an air flow passage centerline extending in a downstream direction from the air inlet to the air outlet; and a pin bank located within the internal air flow passage and having a first column of pins defining a first column centerline forming a first angle relative to the air flow passage centerline, a second column of pins defining a second column centerline forming a second angle relative to the air flow passage centerline, and a third column of pins;

wherein pins of the first column of pins include a first oblong cross-sectional shape;

wherein pins of the second column of pins include a second oblong cross-sectional shape;

wherein the pins of the first column of pins are disposed at a third angle relative to the air flow passage centerline;

wherein the pins of the second column of pins are disposed at a fourth angle relative to the air flow passage centerline;

wherein the fourth angle is different than the third angle;

wherein a first ratio of a first length to a first width of the pins of the first column of pins is equal to or between 1.1:1 and 4:1, a second ratio of a second length to a second width of the pins of the second column of pins is greater than the first ratio, and a third ratio of a third length to a third width of the pins of the third column of pins is less than the first ratio; and wherein the first width and the second width are within 5% of the third width.

17. The turbine engine of claim 16, wherein one of the third angle and the fourth angle is an acute angle and the other of the third angle and the fourth angle is an obtuse angle.

18. The turbine engine of claim 16, the first column and the second column include an equal number of pins.

19. The turbine engine of claim 16, wherein the first angle is equal to the second angle.

* * * * *